United States Patent
Hsiao et al.

(10) Patent No.: US 8,439,576 B2
(45) Date of Patent: May 14, 2013

(54) PHOTOELECTRIC CONNECTOR ASSEMBLY

(75) Inventors: Shih-Wei Hsiao, Tu-Cheng (TW);
Ming-Lun Szu, Tu-Cheng (TW);
Wen-Yi Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 238 days.

(21) Appl. No.: 12/958,362

(22) Filed: Dec. 1, 2010

(65) Prior Publication Data
US 2011/0135254 A1 Jun. 9, 2011

(51) Int. Cl.
*G02B 6/36* (2006.01)
*G02B 6/42* (2006.01)

(52) U.S. Cl.
USPC .............................................. 385/53; 385/93

(58) Field of Classification Search .................... 385/53, 385/93
See application file for complete search history.

(56) References Cited

U.S. PATENT DOCUMENTS 7,699,663 B1 * 4/2010 Little et al. .................... 439/660
2011/0123144 A1 * 5/2011 Wang et al. ..................... 385/14

* cited by examiner

*Primary Examiner* — Omar Rojas
(74) *Attorney, Agent, or Firm* — Wei Te Chung; Ming Chieh Chang

(57) ABSTRACT

A photoelectric connector assembly includes a first and a second connector and a photoelectric signal conversion module. The first connector defines a mating cavity, first terminals including contacting sections exposing to the mating cavity and a first light transmission module including convex lenses at a front thereof exposing to the mating cavity and first light ports at a rear thereof. The second connector includes an insulating seat and second terminals. The seat defines a rear mating end loading the second terminals and a receiving cavity opening upwards. The conversion module is inserted in the receiving cavity and includes second light ports coupled with the first light ports of the first light transmission module and conductive pads touching with the second terminal.

20 Claims, 11 Drawing Sheets

PHOTOELECTRIC CONNECTOR ASSEMBLY

BACKGROUND OF THE INVENTION

1. Field of the Invention

The present invention relates to a photoelectric connector assembly which is adapted for transmission electric and optical signals.

2. Description of Related Art

Signal transmission through optical fiber cables has been developed since light transmission is proven with more advantage than electrics transmission. For example, Intel has issued Light Peak Technology on its website. The Light Peak delivers high bandwidth starting at 10 Gb/s with the potential ability to scale to 100 Gb/s over the next decade. Optical technology also allows for smaller connectors and longer, thinner, and more flexible cables than currently possible. Light Peak also has the ability to run multiple protocols simultaneously over a single cable, enabling the technology to connect devices such as peripherals, displays, disk drives, docking stations, and more. The connector as shown in website connects with a plurality of optical fiber cables at a rear end thereof, through which signals are transmitted by the optical fiber cables to other devices.

We hope to desire an improved photoelectric connector on basis of the Light Peak Technology.

SUMMARY OF THE INVENTION

An object of the present invention is to provide a photoelectric connector occupying a smaller area.

In order to achieve above-mentioned object, a photoelectric connector assembly comprises a first and a second connector and a photoelectric conversion module. The first connector defines a mating cavity running through a front face thereof, first conductive terminals comprising contacting sections exposing to the mating cavity and a first light transmission module comprising convex lenses at a front thereof exposing to the mating cavity and first light ports at a rear thereof The second connector comprises an insulating seat and second conductive terminals. The insulating seat defines a rear mating end loading the second conductive terminals and a receiving cavity opening upwards. The photoelectric conversion module is inserted in the receiving cavity and comprises second light ports coupled with the first light ports of the first light transmission module and conductive pads touching with the second conductive terminal.

Other objects, advantages and novel features of the present invention will become more apparent from the following detailed description of the present embodiment when taken in conjunction with the accompanying drawings.

DETAILED DESCRIPTION OF THE INVENTION

Figure 1:
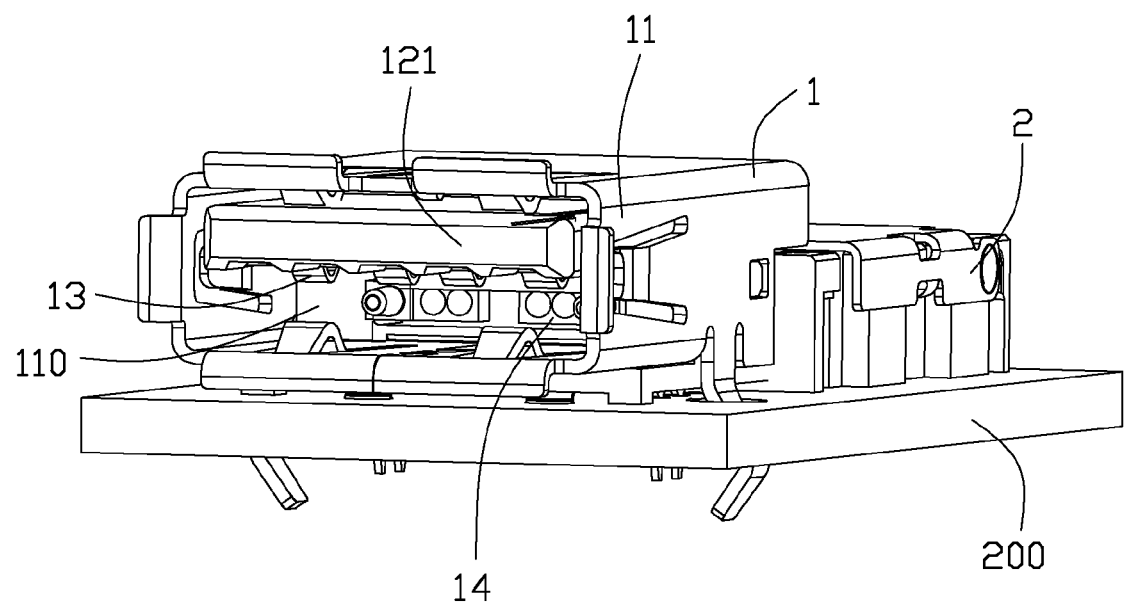
FIG. 1 is a perspective front view of a photoelectric connector assembly mounted on a PCB in accordance with the present invention.

Reference will now be made to the drawing figures to describe the preferred embodiment of the present invention in detail.

Figure 2:
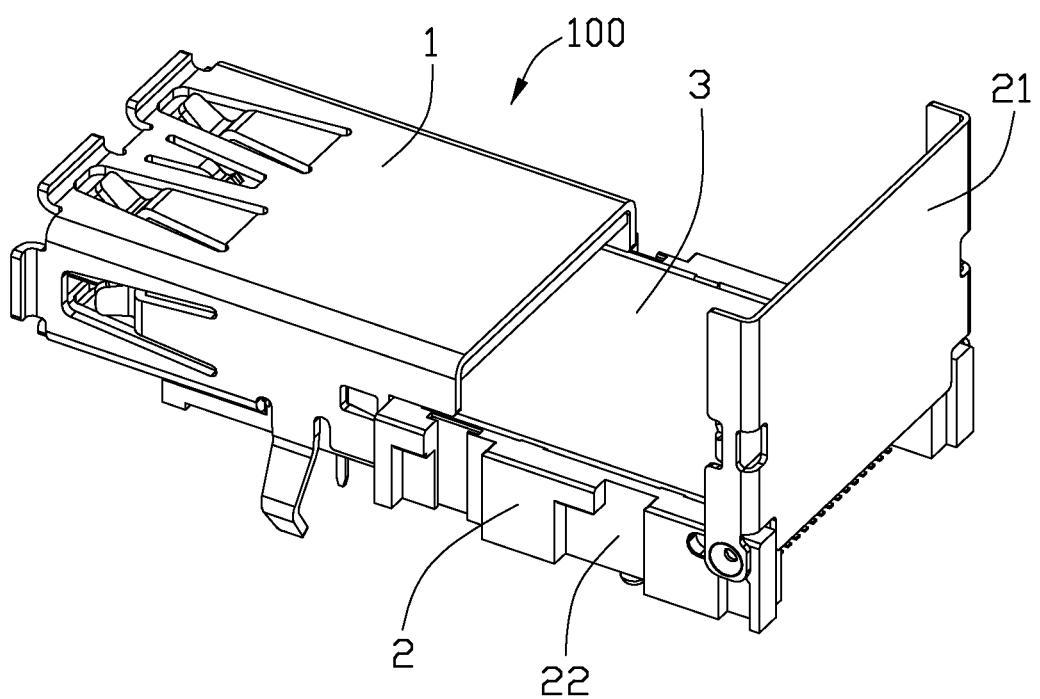
FIG. 2 is a perspective rear view of the assembly.

Referring to FIGS. 1 and 2, a photoelectric connector assembly 100 in accordance with the invention is illustrated, which comprises a first connector 1, a second connector 2 and a photoelectric signal conversion module 3 connecting with said two connectors mounted on a same printed circuit board (PCB) 200 to complete signal transmission. The firs connector 1 is an I/O connector adapted for connection with periphery devices intended to connect with a computer, which includes a mating cavity 110 surrounded by a shielding shell 11 and a plurality of first conductive terminals 13 arranged on a lower surface of a mating tongue 121. The plurality of terminals 13 having contacting sections exposing to the mating cavity 110 is arranged to consistent with USB. A first light transmission module 14 is disposed under the mating tongue to receive and emit light lines. The second connector 2 intending to connect with a controller of the computer, includes an insulating seat 22 and a metal cover 21 rotatably covering on the seat 22. The conversion module 3 is received in the seat and fitly retained by the downward rotated cover 21. The description of said two connectors 1, 2 and the module 3 will be given hereinafter.

Figure 3:
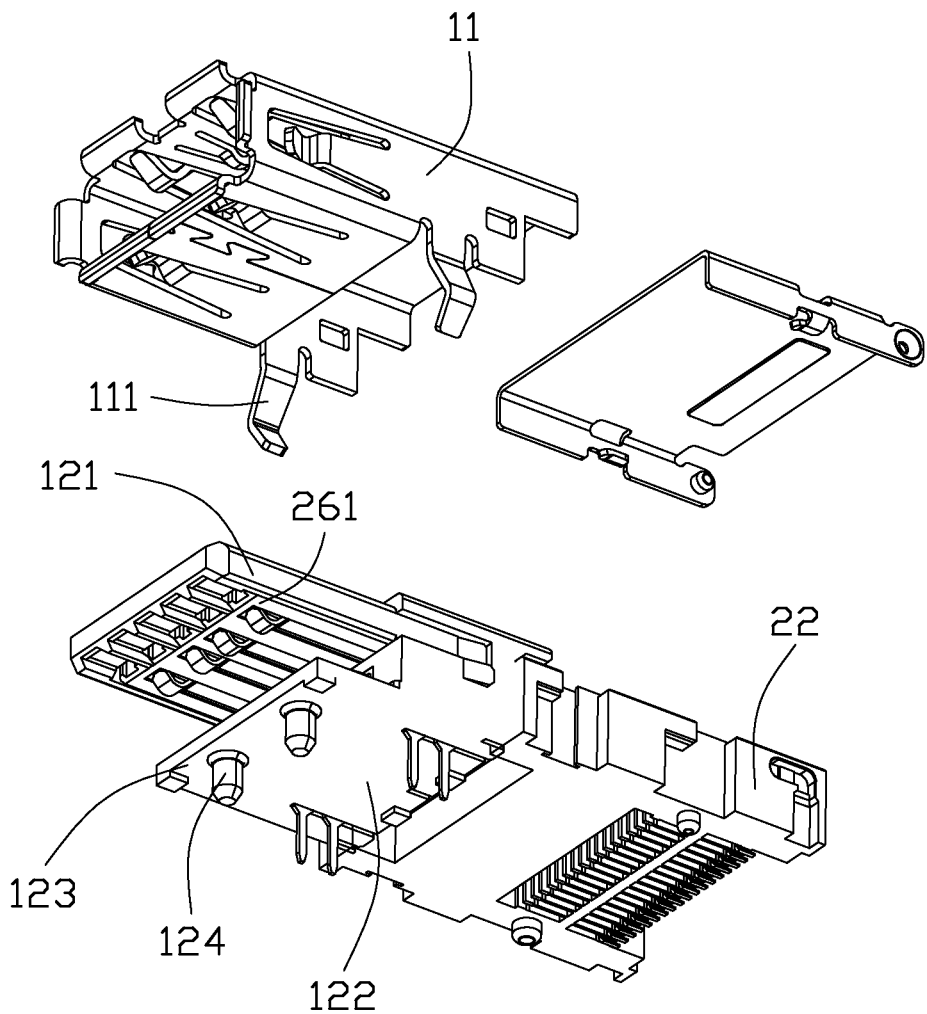
FIG. 3 is an exploded perspective view of the assembly.
Figure 4:
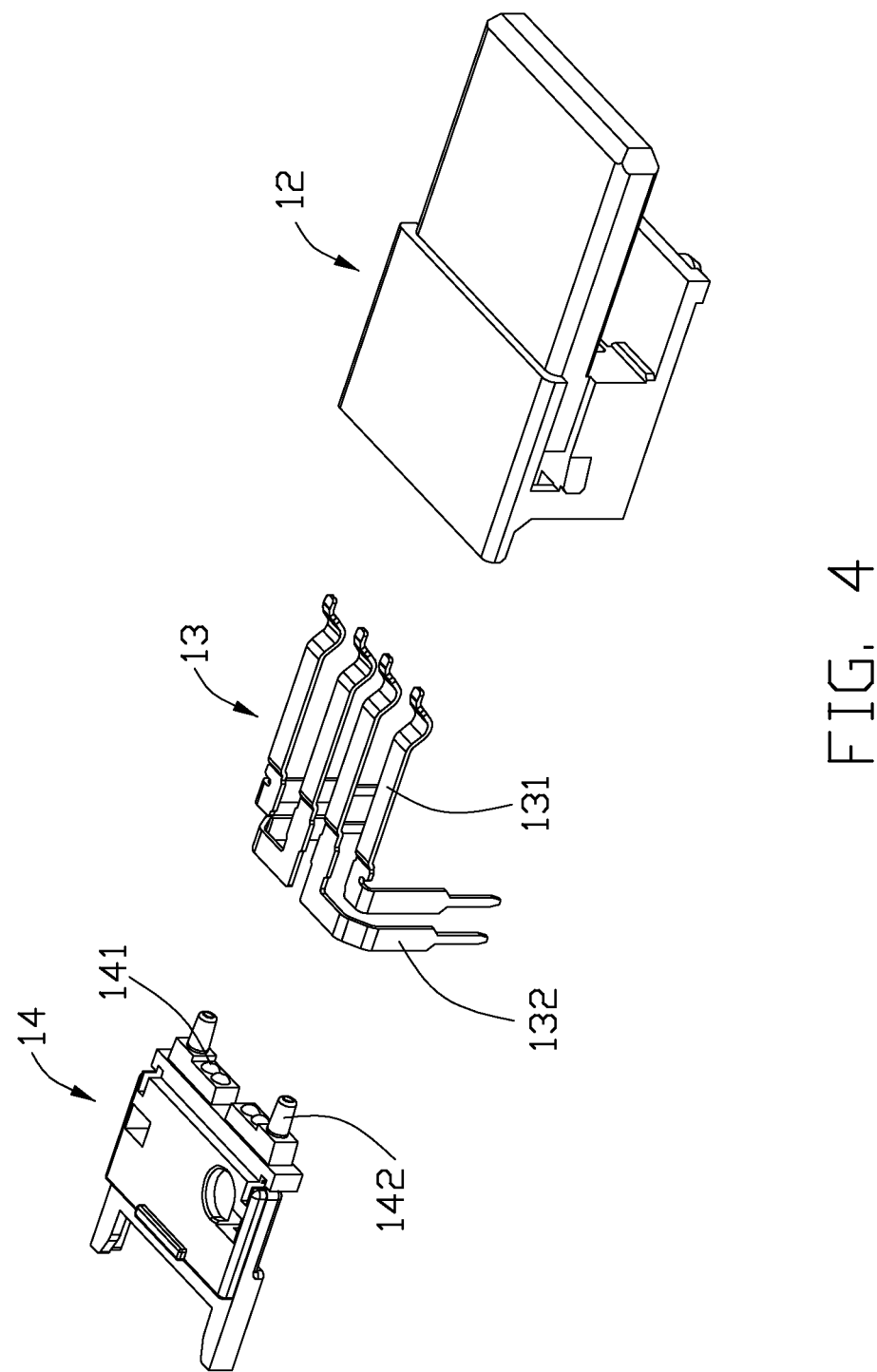
FIG. 4 is an exploded perspective view of a first connector of the assembly from a front view, wherein a shielding shell is taken off.
Figure 5:
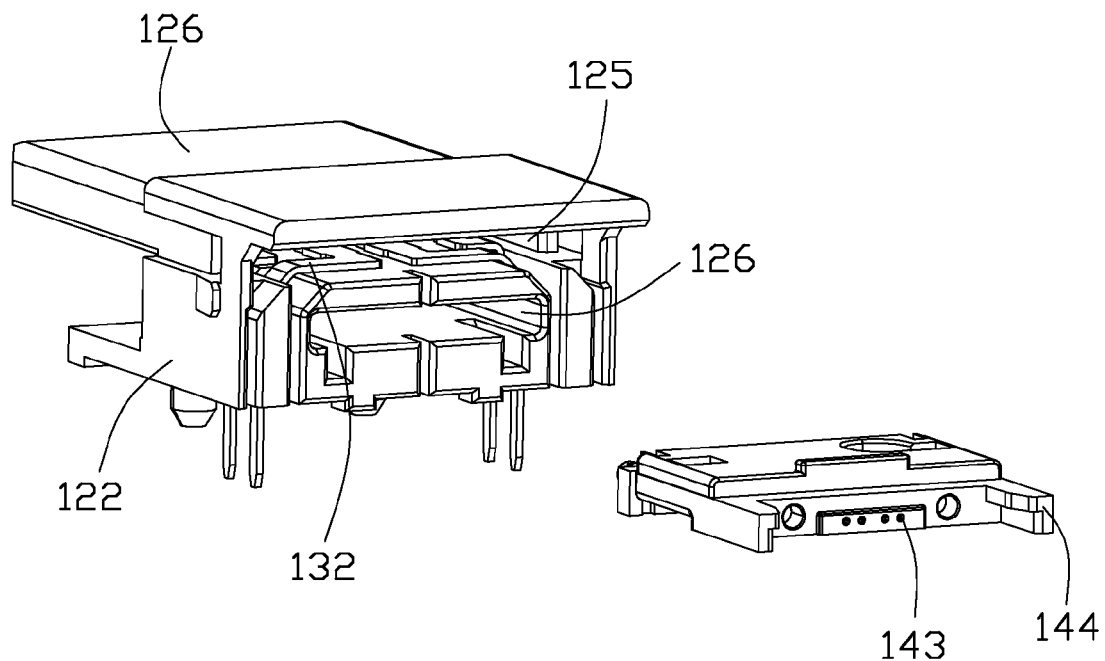
FIG. 5 is similar to FIG. 4 from a rear view.
Figure 6:
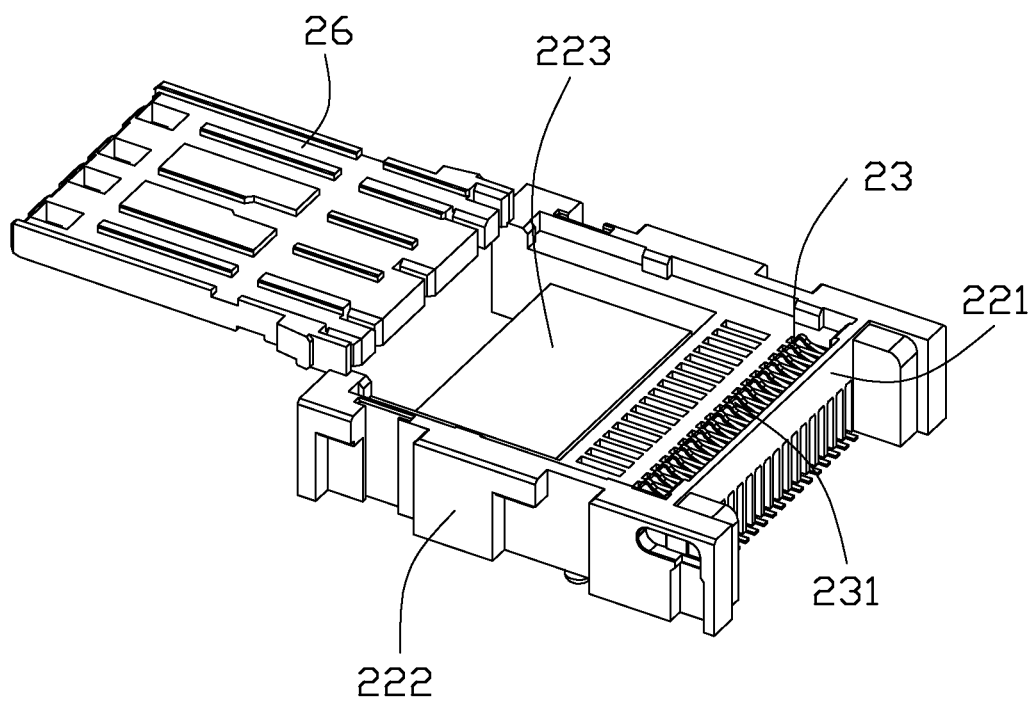
FIG. 6 is a perspective view of a second connector of the assembly from a top view.
Figure 7:
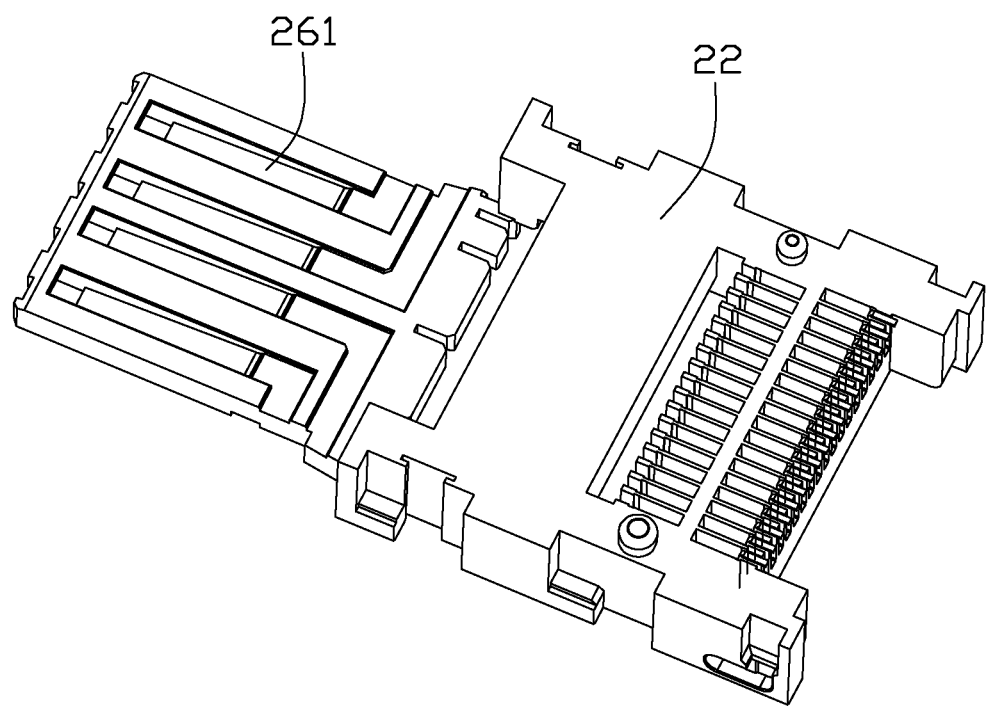
FIG. 7 is similar to FIG. 6 from a bottom view.

Referring to FIGS. 3 through 5, the first connector 1 includes an integrated insulating housing 12 including a base portion 122 and an upper tongue 126 extending from the base portion 122. A lower supporting tongue 123 below and parallel to the upper tongue 126 extends from the base section 122. Two positioning posts 124 protrude downwards from a front edge of the supporting tongue 123. The base portion 122 defines a first receiving groove 125 from a rear edge thereof through the front edge thereof, the first terminals 13 are inserted in the first receiving groove 125 from the rear edge of the base portion and keep close to a bottom face of the first receiving groove 125. A separated partitioned board 26 as shown in FIGS. 6 & 7 is inserted to the first receiving groove 125 above leg portions 132 and the front portion of the partition board 26 is attached below the upper tongue 126 to form said mating tongue 121. So, the contacting sections 131 of said four conductive terminals 13 received in the passageways 261 of the partitioned board 26 are arranged horizontally along a line in the mating tongue 121 and the leg portions 132 perpendicularly to the contacting sections are arranged to two rows at two opposite rear sides of the partitioned board 26 along an insertion direction of the first connector 1. Moreover, a second receiving groove 126 separating from and below the first receiving groove 125 is defined to receive the first light transmission module 14. .

Said first light transmission module 14 has two pairs of first convex lenses 141 at a front face thereof and a pair of guiding posts 142 at opposite sides of the first convex lenses 141 and projecting forwards beyond the convex lenses. The first light transmission module 14 has two pair of optical ports 143 corresponding to the first convex lenses 141 at a rear face thereof and a pair of limiting ribs 144 at opposite sides of the optical ports. The convex lenses 141 adapted for light focus to receive or emit light lines, connect with the first light ports 143 by waveguides or optical fiber 146 as clearly shown in FIG. 11. As a result, the light lines are transmitted to a next element such as conversion module 3 in this embodiment through the first optical ports 143. Alternatively, the optical ports 143 might be desired as the convex lens to avoid light-leakage. The first light transmission module 14 is inserted in the second receiving groove 126 from a rear face of the base portion 122. The convex lenses 141 and the guiding posts 142 expose to the mating cavity 110 under the mating tongue 121.

The shielding shell 11 is of frame shape to surround the insulating seat 12, especially surrounds the mating tongue 121 to define said mating cavity 110 between the lower surface of the mating tongue 121 and the bottom wall of the shell 11. A pair soldering legs 111 extend downwards from two opposite sidewalls of the shell to be connected with the PCB 200.

Referring to FIGS. 3, 6 and 7, the partitioned board 26 of the second connector 2 is located at one end of the insulating seat 22. The partition board 26 is inserted in and through the first receiving groove 125 and fitly above the first terminals so that the contacting sections of the first terminals are received in the passageways 261 recessed at front portion of the partitioned board as aforementioned. Alternatively, the partitioned board 26 can be formed distinct from the insulating seat to be inserted into the first receiving groove 125 or the mating tongue is integrated in the insulating housing 12 of the first connector.

Figure 8:
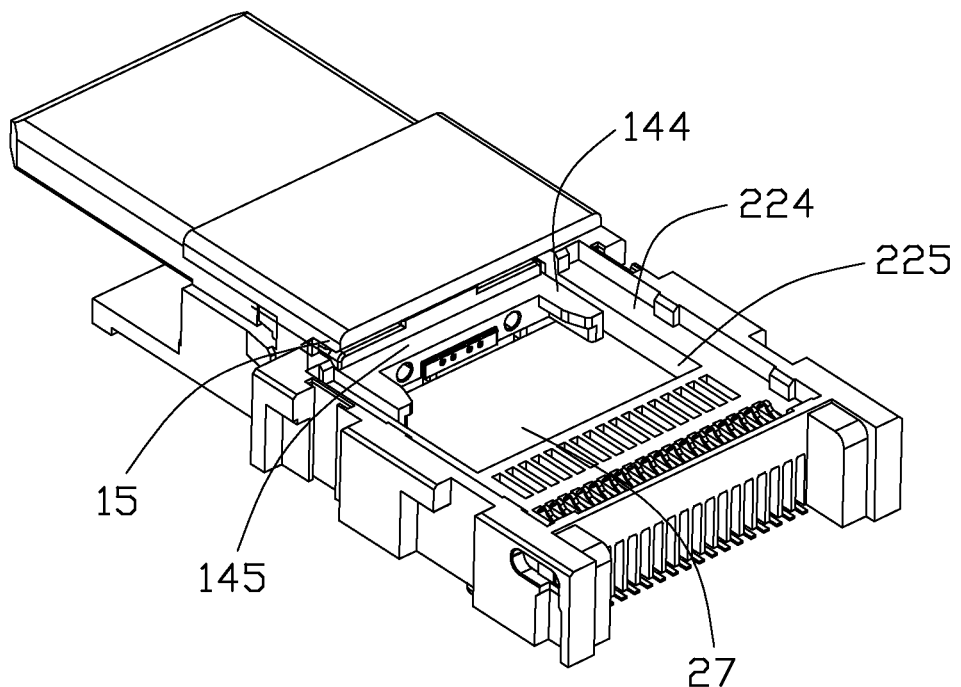
FIG. 8 is a perspective view of the assembly wherein the shielding shell is taken off.

The second connector 2 includes a rear mating end 221 and a pair of sidewalls 222 perpendicular to the mating end 222 with free ends of which the partition board 26 connect. A plurality of second conductive terminals 23 are disposed at said rear mating end 221 with contacting sections 231 exposing upwards to an receiving cavity 223 among in the sidewalls 222 and the mating end 221. The cover 21 is assembled at two sides of the mating end 221 and rotates downward to cover on the two sidewalls as shown in FIG. 2. As shown in FIGS. 5 and 8, after the first terminals 13 of the first connector 1 are assembled in the first receiving groove 125, the first light transmission module 14 is inserted to the second groove 126. Then partitioned board 26 is inserted to the first receiving groove 125 and the cover is assembled on mating end 221 lastly.

As shown in FIG. 8, the insulating seat 22 of second connector 2 includes a supporting surface 224 at a bottom wall thereof and the contacting sections 231 of the second terminals protrude beyond the supporting surface 224. The bottom wall further opens a notch running through a front edge thereof with a lower board 27. So the receiving cavity includes two sections, one upper section above the supporting surface 224 and one lower section above the supporting surface. The rear end 145 of the first light transmission module 14 is received in the lower section of receiving cavity 223 and do not project beyond the supporting surface 224. The pair of limited ribs 144 abuts against the inside faces 225 of the two sidewalls 222. The sidewalls just abut against the opposite sides of the rear portion of the base section of the first connector (clearly shown in FIG. 8). The housing 12 of the first connector extends a ceiling rib 15 downward to limit the first light transmission module 14 shifting in an upper to lower direction.

Figure 9:
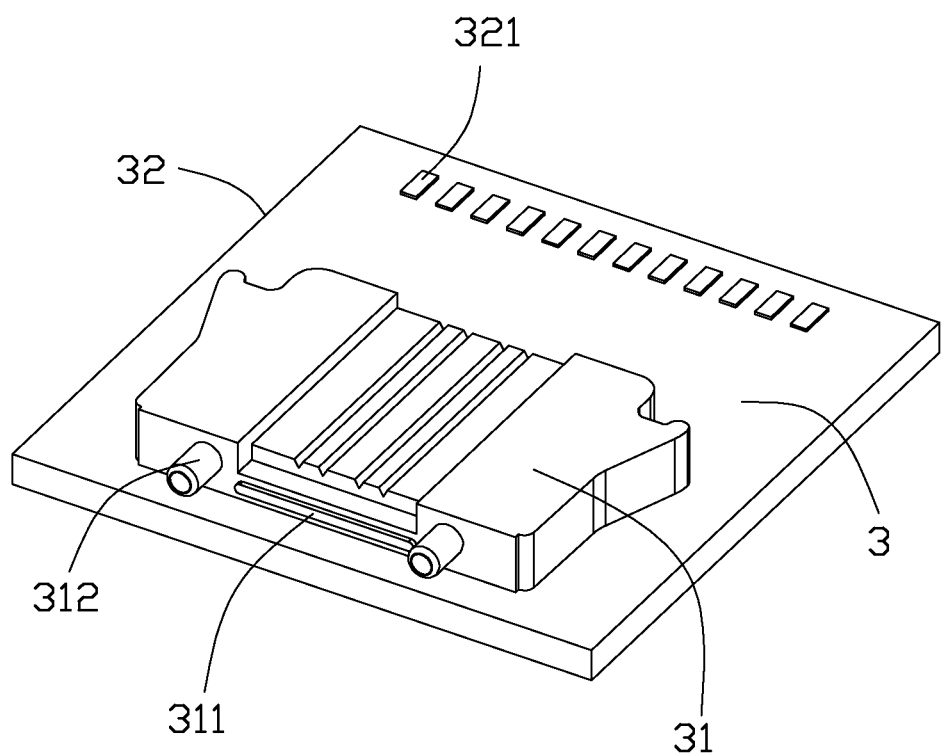
FIG. 9 is a perspective view of a photoelectric conversion module.
Figure 10:
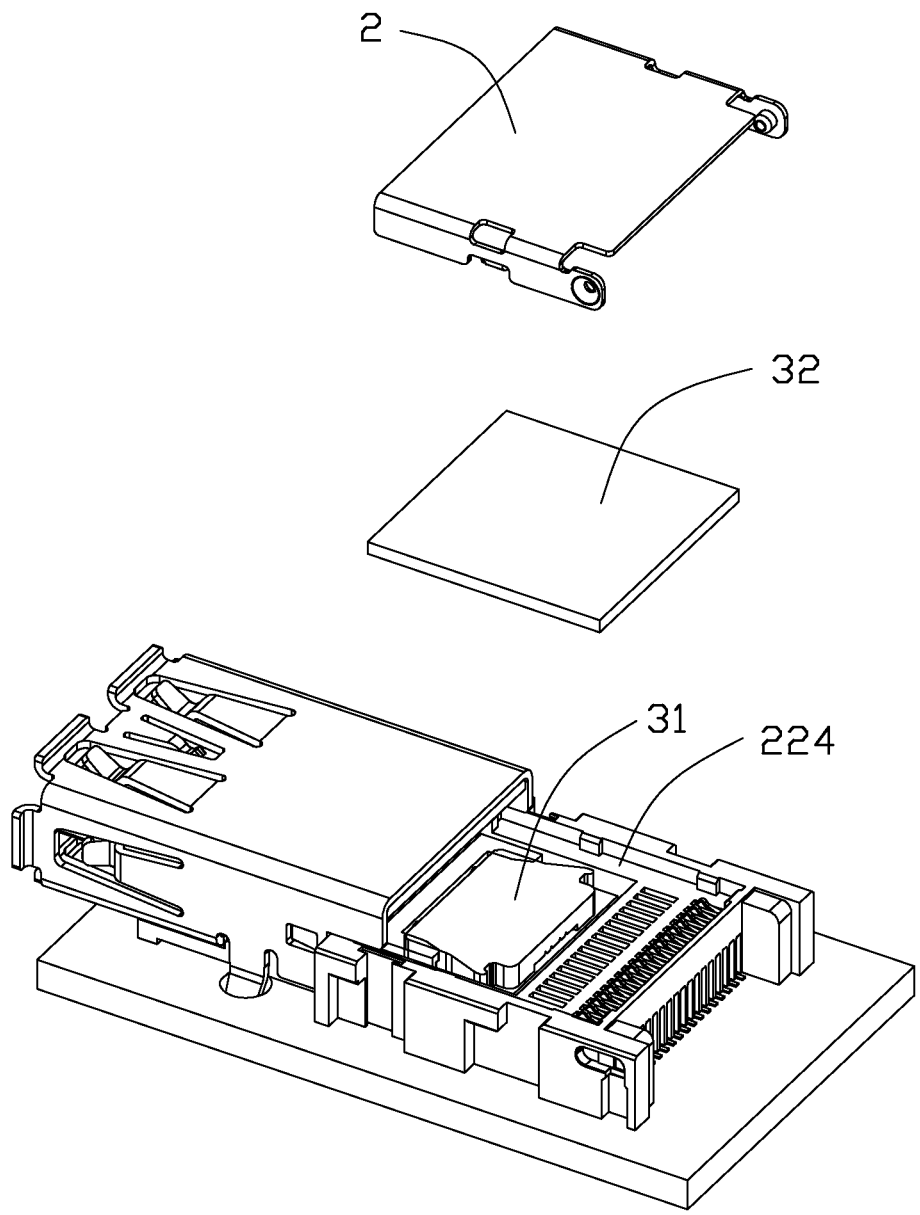
FIG. 10 is a partially exploded perspective view of the assembly.

As shown in FIG. 9, the photoelectric signal conversion module 3 includes a second light transmission module 31 and a substrate 32. The light transmission module 3 has a second light port 311 and guiding posts 312 which are coupled with the correspondence of first light ports of the first light transmission module 14 of the first connector 1. The substrate 32 is disposed with a plurality conductive pads 321 pressing against corresponding contacting sections 231 of second conductive terminal 23 of the second connector 2. Combination with FIG. 2, the conversion module 3 is slantwise inserted into the receiving cavity 223 of the second connector 2, the second light transmission module 31 is aligned and coupled with the first light transmission module 14. Then the conversion module is rotated downwards until completely accommodated in the receiving cavity 23 wherein the contacting sections 231 touch with the conductive pads 321. The cover is lastly rotated downwards to cover on the conversion module 3. The second light transmission module 31 is combined with the substrate 32 together. Please seeing FIG. 10 showing the second light transmission module 31 and the substrate 32 separated from each other, the second light transmission module 31 is located in the lower section of the receiving cavity 223 below the supporting surface 224.

Figure 11:
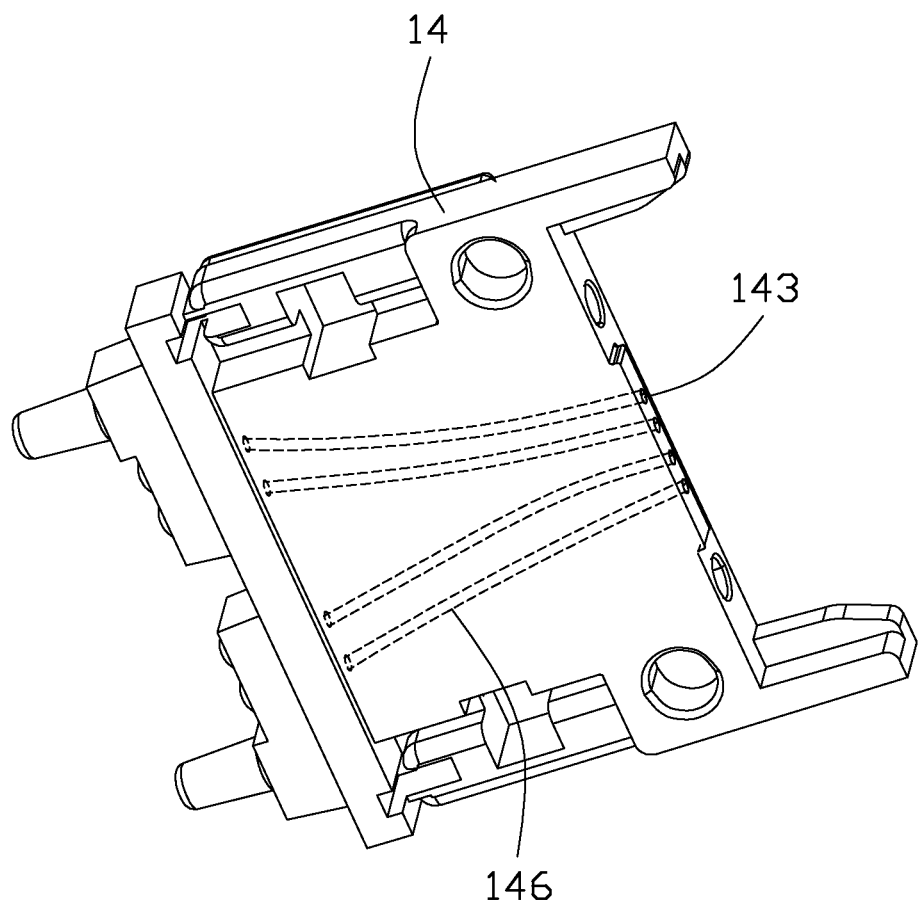
FIG. 11 is a schematic view of a first light transmission module.

As shown in FIG. 11, the first light transmission module 14 defines the embedded optical fibers or waveguides 146 to transmit signal to the second light transmission module 31 of the conversion module 3, displacement with conventional optical fiber cables which might be breakage since expose to an exterior circumstance. Moreover, the combination of said two connectors will occupy a smaller column in the computer.

However, the disclosure is illustrative only, changes may be made in detail, especially in matter of shape, size, and arrangement of parts within the principles of the invention.

What is claimed is:

1. A photoelectric connector assembly comprising:
   a first connector defining a mating cavity running through a front face thereof, first conductive terminals comprising contacting sections exposing to the mating cavity and a first light transmission module comprising convex lenses at a front thereof exposing to the mating cavity and first light ports at a rear thereof;
   a second connector comprising an insulating seat and second conductive terminals, the insulating seat defining a rear mating end loading the second conductive terminals and a receiving cavity opening upward;
   a photoelectric signal conversion module inserted in the receiving cavity and comprising second light ports coupled with the first light ports of the first light transmission module and conductive pads touching with the second conductive terminal.

2. The photoelectric connector assembly as described in claim 1, wherein the second connector is located abutting against a rear end of the first connector.

3. The photoelectric connector assembly as described in claim 2, wherein the receiving cavity is surrounded by the mating end and a pair of sidewalls of the second connector, the first light transmission module defines a pair of limited ribs at opposite sides of the convex lenses pressing against insides of the pair of sidewalls.

4. The photoelectric connector assembly as described in claim 3, wherein the photoelectric signal conversion module comprises a second light transmission module on a front of which said second light ports are formed and a substrate on which said conductive pads are disposed, the substrate is combined with the second light transmission module.

5. The photoelectric connector assembly as described in claim 4, wherein the first light transmission are embedded with optical fibers or waveguides to connect with the convex lenses and the first light ports.

6. The photoelectric connector assembly as described in claim 5, wherein the mating cavity of the first connector comprises a mating tongue in the mating cavity and the contacting section of the first conductive terminals are arranged on the mating tongue and the convex lenses is located under the mating tongue.

7. The photoelectric connector assembly as described in claim 6, wherein the mating tongue is formed by a partition board inserted from the rear end of the first connector, the partition board is integrally formed with the pair of the sidewalls of the insulating seat.

8. The photoelectric connector assembly as described in claim 7, wherein the first light transmission module is inserted from a rear end of the insulating housing.

9. The photoelectric connector assembly as described in claim 1, wherein the second connector comprises a cover rotatably assembled at opposite sides of the mating end thereof and covering on the receiving cavity.

10. An photoelectric connector comprising:
   an insulating housing defining a front edge and a rear edge and comprising a base portion and a mating tongue extending forwards;
   a shielding shell surrounding the insulating housing and defining a mating cavity between a surface of the mating tongue and the shielding shell;
   a plurality of conductive terminals comprising contacting sections arranged on said surface of the mating tongue and exposing to the mating cavity and leg sections;
   a light transmission module comprising convex lens at a front face thereof projecting forward in the mating cavity and light ports at a rear face thereof, the light ports exposing to the rear edge of the insulating housing to couple with light ports of another light transmission module.

11. The photoelectric connector as described in claim 10, wherein the leg sections are arranged in two rows at two sides of the light transmission module.

12. A photoelectric connector assembly comprising:
   a first connector unit defining an outward I/O (Input/Output) port equipped with an electrical part and an optical part, said electrical part including a plurality of first contacts having contacting sections in the I/O port and a leg section for mounting to a printed circuit board, said optical part including a first light transmission module communicating with an exterior via said I/O port;
   a second connector unit defining a receiving cavity and equipped with a plurality of second contacts having contacting portions and mounting portions thereof for mounting to the printed circuit board; and
   a second light transmission module associated with a substrate commonly received in the receiving cavity under condition that the first light transmission module and the second light transmission module are aligned with each other for light transmission, and said substrate mechanically and electrically connects to the contacting portions of said second contacts.

13. The photoelectric connector assembly as claimed in claim 12, wherein the first connector defines a first housing to hold the first contacts and the first light transmission module, and the second connector defines a second housing to hold the second contacts and the second light transmission module under condition that said first housing and said second housing are intimately arranged with each other.

14. The photoelectric connector assembly as claimed in claim 13, wherein said first housing and said second housing are integrally formed with each other.

15. The photoelectric connector assembly as claimed in claim 13, wherein said first housing and said second housing are unitarily formed with each other.

16. The photoelectric connector assembly as claimed in claim 13, wherein each of said first housing and said second housing has mounting posts for mounting to the printed circuit board.

17. The photoelectric connector assembly as claimed in claim 12, wherein the second contacts are essentially locate opposite to the I/O port with the first light transmission module and the second light transmission module therebetween.

18. The photoelectric connector assembly as claimed in claim 12, wherein said second light transmission module and the associated substrate are easily withdrawn from the receiving cavity of the second connector.

19. The photoelectric connector assembly as claimed in claim 18, wherein said second connector is equipped with a metallic shell moveably covering an upward opening of the receiving cavity, through which said second light transmission module and the associated substrate can be withdrawn from the receiving cavity.

20. The photoelectric connector assembly as claimed in claim 19, wherein said shell is pivotally mounted upon the second connector, a pivot axis of said shell is located around a rear end of the second connector farther from the first connector.

* * * * *